United States Patent
Roodman (12) 
(10) Patent No.: US 6,425,941 B1
(45) Date of Patent: Jul. 30, 2002

(54) OXIDATION RESISTANT GRANULAR ACTIVATED CARBON

(75) Inventor: Robert G. Roodman, Ellwood City, PA (US)

(73) Assignee: Envirotrol, Inc., Sewickley, PA (US)

( * ) Notice: Subject to any disclaimer, the term of this patent is extended or adjusted under 35 U.S.C. 154(b) by 31 days.

(21) Appl. No.: 09/641,222

(22) Filed: Aug. 17, 2000

(51) Int. Cl.⁷ ................................................ B01D 53/04
(52) U.S. Cl. ............................. 95/143; 95/144; 95/148; 95/901; 502/416
(58) Field of Search ........................ 95/141, 143–148, 95/901; 96/108; 502/416

(56) References Cited

U.S. PATENT DOCUMENTS

| | | | | |
|---|---|---|---|---|
| 3,706,181 A | * | 12/1972 | Walker et al. | 95/145 |
| 3,870,482 A | * | 3/1975 | Walker et al. | 95/145 |
| 4,293,317 A | * | 10/1981 | Kovach | 95/901 X |
| 4,802,898 A | * | 2/1989 | Tolles | 95/901 X |
| 5,073,454 A | | 12/1991 | Graham | 428/403 |
| 5,149,342 A | | 9/1992 | Mestemaker et al. | 55/59 |
| 5,217,505 A | | 6/1993 | Maroldo et al. | 55/16 |
| 5,281,257 A | * | 1/1994 | Harris | 95/147 X |
| 5,540,757 A | * | 7/1996 | Jordan, Sr. | 95/146 X |
| 5,700,436 A | | 12/1997 | Doughty et al. | 423/210 |
| 5,733,515 A | | 3/1998 | Doughty et al. | 423/210 |
| 6,096,116 A | * | 8/2000 | Huff, Jr. et al. | 95/147 X |

FOREIGN PATENT DOCUMENTS

| | | | | |
|---|---|---|---|---|
| JP | 54-040285 | * | 3/1979 | 95/141 |
| SU | 660936 | * | 5/1979 | 95/141 |

OTHER PUBLICATIONS

Hofelich, Thomas C., "Prevent Thermal Runaways in Carbon Beds," Chemical Engineering, Jan. 2000, pp. 99–102.
Henning, K.–D., "Purification of Air, Water and Off Gas—Solvent Recovery," 19$^{th}$ Biennial Conference on Carbon, Jun. 25–30, 1989.
ASTM D 3466–76, "Standard Test Method for Ignition Temperature of Granular Activated Carbon".
ASTM D 2862—97, "Standard Test Method for Particle Size Distribution of Granular Activated Carbon".
ASTM D 5228—92, "Standard Test Method for Determination of the Butane Working Capacity of Activated Carbon".
ASTM D 5742—95, "Standard Test Method for Determination of the Butane Activity of Activated Carbon".

* cited by examiner

Primary Examiner—Robert H. Spitzer
(74) Attorney, Agent, or Firm—Webb Ziesenheim Logsdon Orkin & Hanson, P.C.

(57) ABSTRACT

The present invention is directed to an activated carbon composition that is resistant to oxidation and the activated carbon bed fires that can result from uncontrolled oxidation of the activated carbon bed. The activated carbon composition of the present invention includes from about 0.0001–25 wt. % of an antioxidant and from about 75–99.9999 wt. % activated carbon including any and all other impregnants and moisture. The presence of the antioxidant on the surface of the activated carbon inhibits uncontrolled oxidation and the activated carbon bed fires that can result. A method of removing solvents from a solvent-laden gas is also disclosed. The method includes passing the solvent-laden gas through an activated carbon bed, which contains the activated carbon composition described above.

47 Claims, 5 Drawing Sheets

OXIDATION RESISTANT GRANULAR ACTIVATED CARBON

BACKGROUND OF THE INVENTION

1. Field of the Invention

This invention relates to activated carbon used for vapor phase operations, especially solvent recovery operations. More specifically, this invention relates to granular activated carbon that has been modified to minimize or prevent the occurrence of granular activated carbon bed fires during and after adsorption of volatile organic compounds from gas streams.

2. Description of the Prior Art

Granular activated carbon (GAC) has been a technically and economically successful material for use in solvent recovery from gas streams for many years. Solvent recovery by GAC adsorption is usually a batch operation involving multiple beds. At least one GAC bed remains online while others are being regenerated. The adsorber inlet gas stream is typically pre-treated to remove solids (dust), liquids (droplets or aerosols), or high-boiling components that may hamper the performance of the GAC bed. The filtered solvent-laden inlet gas stream is passed upwardly through the fixed GAC bed, which adsorbs the solvent from the solvent-laden gas stream.

GAC that has adsorbed its capacity of solvent or chemical contaminants can be reused if the adsorbed solvent is removed. This is termed regeneration of the GAC. This regeneration can be done either by vapor stripping with steam or hot nitrogen, or by removing the carbon from the bed and thermally reactivating it on site or off site. Spent GAC is usually regenerated with downward flowing low-pressure steam or hot nitrogen gas. This removes the adsorbed solvent, which is typically recovered by condensing the vapors and separating the solvent from water by either decantation or distillation. After steam regeneration, the hot wet GAC bed is dried, typically by use of a hot air stream. The GAC bed is then cooled by an ambient temperature air stream prior to beginning its next adsorption cycle. These methods leave a heel of material in the carbon pores that eventually necessitate the thermal reactivation of the carbon, either on site or off site.

By design, GAC systems can adsorb up to 30–40 wt. % organics. Unfortunately, carbon-based adsorption systems can also sustain oxidation at fairly low even ambient temperatures. This is particularly true if ketones and aldehydes are part of the solvent mixture being adsorbed. Methyl ethyl ketone (MEK) and cyclohexanone (CH) are particularly prone to oxidation. The GAC can act as a catalyst for this oxidation (Henning et al., "Purification of Air, Water and Off Gas Solvent Recovery", $19^{th}$ Biennial Conference on Carbon, Jun. 25–30, 1989, pp. 1–10). The oxidation will often ultimately result in spontaneous combustion in GAC beds, either in service or idle.

GAC bed fires occur when the heat gain from the heat of adsorbtion of organics and oxidation of the adsorbed organics outpaces any heat loss via conductive or convective cooling mechanisms. Such conditions can lead to a thermal runaway.

One method that has been used to attempt to minimize the occurrence of GAC bed fires is to employ engineering design controls (Hofelich et al., "Prevent Thermal Runaways in Carbon Beds", Chemical Engineering, January 2000, pp. 99–102). These methods entail monitoring the GAC bed temperature for indications of oxidation occurring. If the GAC bed temperatures indicate a potential runaway situation, controls such as flooding the GAC bed with inert gas are initiated to stop the reaction. These engineering solutions have proven to be marginally successful, as localized "hot spots" in the GAC bed are not always detected. This can result in a GAC bed fire beginning before the engineering controls detect that a problem exists.

U.S. Pat. No. 5,073,454 to Graham discloses coating activated carbon with an intumescent material, which will expand at an elevated temperature and render the activated carbon resistant to oxidation. This method, however, decreases the adsorption capacity of the activated carbon, especially at elevated temperatures, all the way to completely removing the adsorptive capacity.

U.S. Pat. No. 5,217,505 to Maroldo et al. discloses a process for removing an oxidizable organic compound from an oxidizing gas stream which includes contacting the gas stream with a GAC bed which also includes porous pyrolyzed particles of a polysulfonated cross-linked synthetic copolymer. The pyrolyzed copolymer is added to adsorb the oxidizable organic compound. This method decreases the amount of oxidizable organic compounds adsorbed on GAC, but does not eliminate it. Thermal excursions and GAC bed fires are still able to occur using the above-described method.

There remains an established need to prevent the occurrence of GAC bed fires in such a way as to not decrease the adsorption potential of the GAC. In order to be economical, any method for preventing GAC bed fires must also provide for the regeneration of the GAC for reuse.

SUMMARY OF THE INVENTION

The present invention is directed to an activated carbon composition that is resistant to oxidation and the activated carbon bed fires that can result from uncontrolled oxidation of the activated carbon bed. The activated carbon composition of the present invention includes from about 0.0001–25 wt. % of an antioxidant and from about 75–99.9999 wt. % activated carbon, including any and all other impregnants and moisture. The presence of the antioxidant on the surface of the activated carbon inhibits uncontrolled oxidation and the activated carbon bed fires that can result.

The present invention is also directed to a method of preventing activated carbon bed fires. The method includes treating the activated carbon to be used in the bed with an antioxidant such that the resulting activated carbon composition includes from about 0.0001–25 wt. % of an antioxidant and from about 75–99.9999 wt. % activated carbon including any and all other impregnants and moisture.

The present invention also provides a method of removing solvents from a solvent laden gas. The method includes passing the solvent laden gas through an activated carbon bed which contains an activated carbon composition that includes from about 0.0001–25 wt. % of an antioxidant and from about 75–99.9999 wt. % activated carbon including any and all other impregnants and moisture.

The present invention is further directed to a method of regenerating an oxidation resistant activated carbon that has been saturated with organic material. The method includes the steps of heating the activated carbon to a temperature in excess of about 200° F., by applying downward flowing low-pressure steam or hot nitrogen to remove the organic material from the surface of the activated carbon, and treating the activated carbon with an antioxidant such that the resulting activated carbon composition includes from about 0.0001–25 wt. % of an antioxidant and from about 75–99.9999 wt. % activated carbon including any and all impregnants and moisture.

The present invention is also directed to a method of thermally regenerating an oxidation resistant activated carbon that has been saturated with organic material. The method includes the steps of placing the activated carbon in a direct or indirect fired kiln or Hirschoff furnace; heating the activated carbon to about 1,000–2,000° F. in an activating gas atmosphere to remove the organic material from the surface of the activated carbon maintaining the kiln or furnace temperature for 1–12 hours and cooling the activated carbon to ambient temperature; and treating the activated carbon with an antioxidant such that the resulting activated carbon composition includes from about 0.001–25 wt. % of an antioxidant and from about 75–99.9999 wt % activated carbon including any and all other impregnants and moisture.

DESCRIPTION OF THE PREFERRED EMBODIMENTS

The activated carbon composition of the present invention is resistant to oxidation and the activated carbon bed fires that can result from uncontrolled oxidation of chemicals treated by the activated carbon bed and, subsequently, of the bed itself. The problem of activated carbon bed fires is overcome by the addition of an antioxidant to the surface of the activated carbon. The addition of the antioxidant is accomplished, as will be explained, in such a way as to minimize the loss of adsorbtivity or activity of the resulting activated carbon composition. The activated carbon composition of the present invention includes from about 0.0001–25 wt. %, preferably about 0.01–20 wt. % and, most preferably, about 0.1–15 wt. % of an antioxidant and from about 75–99.9999 wt. %, preferably about 80–99.99 wt. % and, most preferably, about 85–99.9 wt. % activated carbon including any and all other impregnants and moisture. The presence of the antioxidant on the surface of the activated carbon inhibits uncontrolled oxidation and the activated carbon bed fires that can result.

Any antioxidant that will prevent the oxidation of organic materials, especially ketones, aldehydes and carboxylic acids, on the surface of activated carbon, when exposed to oxygen can be used as part of the present invention. Examples of antioxidants that can be used in the present invention include butylated hydroxyanisole (BHA); butylated hydroxytoluene (BHT); tert-butylcatechol (TBC); 2,6-di-t-butyl paracresol; 2,2'-methylene-bis-(6-t-butyl-phenol); 2,2'-thiobis-(4-methyl-6-t-butyl-phenol); 2,2'-methylene-bis-(6t-butyl-4-ethyl-phenol); 4,4'-butylene-bis-(6-t-butyl-m-cresol); 2-(4-hydroxy-3,5-di-t-butyl anilino)-4,6-bis-(octylthio)-1,3,5-triazine; hexahydro-1,3,5-tris-(3,5-di-t-butyl-4-hydroxy phenyl)-propionyl-s-triazine; hexahydro-1,3,5-tris-(3,5-di-t-butyl-4-hydroxy benzyl) isocyanurate; tetrakismethylene-3-(3',5'-di-t-butyl-4'-hydroxyphenyl) propionate methane; distearyl thiodipropionate; dilauryl thiodipropionate; tri(nonylphenyl) phosphite (TNPP); tin thioglycolate; alkylated monophenols; alkylated hydroquinone; hydroxylated thiodiphenylethers; alkylidene-bisphenols; benzyl compounds; acylaminophenols; amides of β-3,5-di-tert-butyl-4-hydroxyphenyl-proprionic acid; phenothiazine and its derivatives; alkyl; aryl and alkaryl phosphites; esters of thioproprionic acid; Goodrite® 3114 (tris(3,5-di-tert-butyl-4-hydroxybenzyl)isocyanurate) and 3125 (poly(3,5-di-tert-butyl-4-hydroxy hydrocinamic acid ester/1,3,5-tris(2-hydroxyethyl)-5-triazine-2,4,6(1H, 3H, 5H)-trione) from the BFGoodrich Company, Cleveland, Ohio, Irganox® 1010 (pentaerythritol tetrakis(3-(3,5-di-tert-butyl-4-hydroxyphenyl)proprionate), CAS Number 006683-19-8), 1035 (thiodiethylene bis[3-(3,5-di-tert-butyl-4-hydroxyphenyl)propionate], CAS Number 041484-35-9), 1076 (octadecyl-3-(3,5 -di-tert-butyl-4-hydroxyphenyl)-propionate, CAS Number 2082-79-3), 1081 (6,6'-di-tert-butyl-2,2'-thiodi-p-cresol, CAS Number 000090-66-4), 1093, 1098 (n,n'-hexane- 1,6-diylbis[3-(3,5-di-tert-butyl-4-hydroxyphenylproprionamide], CAS Number 023128-74-7), 1135 (3,5-bis (1,1-dimethyl-ethyl)-4-hydroxy-C7-C9 branched alkyl esters of benzenepropanoic acid, CAS Number 125643-61-0), 1141 (2,4-dimethyl-6-(1-methylpentadecyl)-phenol, CAS Number 134701-20-5), 1330 (3, 3', 3", 5, 5', 5"-hexa-tert-butyl-α, α', α"-(mesitylene-2,4,6-triyl) tri-p-cresol, CAS Number 001709-70-2), 1425 (calcium diethyl bis [[[3,5-bis(1,1-dimethylethyl)-4-hydroxyphenyl] methyl] phosphonate], CAS Number 065140-91-2), 1520 (4,6-bis (octylthiomethyl)-o-cresol, CAS Number 110553-27-0), 245 (ethylenebis (oxyethylene) bis-(3-(5-tert-butyl-4-hydroxy-m-tolyl)-propionate), CAS Number 36443-68-2), 259 (hexamethylene bis (3-(3,5-di-tert-butyl-4-hydroxyphenyl) propionate), CAS Number 35074-77-2), 3052 (2-(1,1 -dimethylethyl)-6-[[3-(1,1-dimethylethyl)-2-hydroxy-5-methylphenyl] methyl-4-methylphenyl acrylate, CAS Number 61167-58-6), 3114 (1,3,5-tris(3,5-di-tert-butyl-4-hydroxybenzyl)-1,3,5-triazine-2,4,6(1H,3H,5H)-trione, CAS Number 27676-62-6), 3125 ((2,4,6-trioxo-1,3, 5-triazine-1,3,5(2H,4H,6H)-triyl) triethylene tris(3-(3,5-di-tert-butyl-4-hydroxphenyl)propionate), CAS Number 34137-09-02), 5057 (reaction products of n-phenyl-benzenamine and 2,4,4-trimethylpentene, CAS Number 68411-46-1), 565 (2,6-di-tert-butyl-4-(4,6-bis(octylthio)-1, 3,5-triazin-2-ylamino)phenol, CAS Number 991-84-4), and antioxidant mixtures such as Irganox® B1171, B1411, B1412, B215, B220, B225, B311, B3557, B3596, B501W, B561, B612, B900, B911, B921FF, B991 and E201 from Ciba Specialty Chemicals, Basel, Switzerland, Recycloblend® 660, from Ciba Specialty Chemicals and Recyclostab® 411, 421 and 451 from Ciba Specialty Chemicals. Preferred antioxidants include: butylated hydroxyanisole (BHA); butylated hydroxytoluene (BHT); tert-butylcatechol (TBC); tri(nonylphenyl) phosphite (TNPP); and the above-mentioned Irganox® antioxidants from Ciba Specialty Chemicals. The most preferred antioxidants are butylated hydroxyanisole (BHA), butylated hydroxytoluene (BHT), tert-butylcatechol (TBC).

The activated carbon used in the present invention can be derived from any suitable carbon source known in the art. The activated carbon is formed by placing the carbon source in a high temperature environment and exposing the carbon source to an activating gas or other activating chemical agent, increasing the porosity of the resulting activated carbon. Carbon sources include coal, such as bituminous, anthracite and lignite; wood; peat; coconut shells; and synthetic polymers. Preferred carbon sources are coal and coconut shells. It is preferred that the activated carbon be in a granular activated carbon (GAC) form. The particle size of the activated carbon can be important in regard to the susceptibility to oxidation. The particle size of the activated carbon is characterized by the screen size of U.S. standard sieves through which the activated carbon particles will pass. For example, a No. 4 sieve has square screen openings that are 4.75 mm or 0.187 inch on each end. The sieve number relates to the number of openings per inch, so a larger sieve number corresponds to a smaller particle size. For example, a No. 16 sieve has square screen openings that are 1.18 mm or 0.0469 inch on each end, much smaller than a No. 4 sieve. The width of the activated carbon particle size distribution is described by the size of the first and last of U.S. Standard Sieves that capture the activated carbon particles as described in ASTM D 2862–82. The activated carbon particle size distribution (ACPSD) can be as wide as an ACPSD described by the range of a No. 2 to a No. 40 sieve, which is expressed as 2×40; preferably the ACPSD range is no wider than a No. 2 sieve to a No. 30 sieve, expressed as 2×30; and, most preferably, the ACPSD range is no wider than a No. 4 sieve to a No. 20 sieve, expressed as 4×20.

The activated carbon composition of the present invention is prepared by treating an activated carbon with an antioxidant such that the resulting activated carbon composition includes from about 0.0001–25 wt. %, preferably about 0.01–20 wt. % and, most preferably, about 0.1–15 wt. % of an antioxidant and from about 75–99.9999 wt. %, preferably about 80–99.99 wt. % and, most preferably, about 85–99.9 wt. % activated carbon including any and all other impregnants and moisture. The method of treating the activated carbon includes making a solution of the antioxidant in a suitable solvent and applying the solution to the activated carbon. The carbon is then dried, evaporating the solvent and leaving the antioxidant on the surface of the activated carbon. The drying step can be carried out under any conditions that do not evaporate or decompose the antioxidant or activated carbon. For example, the activated carbon-antioxidant composition can be dried at ambient conditions for 40 hours. It is preferred that the activated carbon-antioxidant composition be dried at an elevated temperature to enhance the evaporation of the solvent. Suitable drying conditions are about 35–300° C., preferably about 50–250° C. and, most preferably, about 100–200° C. The time for evaporating the solvent from the activated carbon-antioxidant composition is the amount of time required to effectively remove the solvent from the surface of the activated carbon. The amount of time is dependent on the temperature employed. Typically, the time for evaporation of the solvent will be about 1–40 hours, preferably about 2–32 hours and, most preferably, about 3–24 hours.

Suitable solvents that can be used as a treatment solvent to prepare the present activated carbon as part of the present invention include any liquid that will adequately dissolve the antioxidant and that can be subsequently removed by evaporation after the solution is applied to the activated carbon. Preferred solvents include xylene; mineral spirits; methanol; ethanol; isopropyl alcohol; n-propanol; water; cyclohexane; ethylacetate; n-hexane; and toluene. The most preferred solvents are xylene; methanol; and isopropyl alcohol.

The solution of antioxidant and solvent is prepared by mixing the antioxidant into the solvent at a weight ratio of about 2:1–1:1 0, preferably about 1.5:1 to about 1:5 and, most preferably, about 1:1–1:3 antioxidant to solvent. The solution of antioxidant and solvent can be applied to the activated carbon in any suitable manner. The solution can be sprayed, either as droplets or in an aerosol form, onto the surface of the activated carbon; the solution can be bubbled through a bed of activated carbon; or the activated carbon can be immersed in the solution. After applying the solution to the activated carbon, the solvent is removed from the activated carbon. The solvent is generally removed through evaporation, as explained above, through mild temperature elevation or increased airflow through the activated carbon bed. When the solvent has been removed from the activated carbon, the antioxidant treated activated carbon or antioxidant-activated carbon composition is ready for use.

Alternatively, the antioxidant or solution of antioxidant and solvent may be vaporized and the resulting vapor passed through the activated carbon bed. The antioxidant, in vapor form, adsorbs directly onto the surface of the activated carbon. This results in a direct vaporization method for applying the antioxidant to the activated carbon.

The antioxidant-activated carbon composition of the present invention is useful for removing solvents or other contaminants from a laden gas. The method of the present invention involves passing the solvent-laden gas through an activated carbon bed which contains an activated carbon composition that includes from about 0.0001–25 wt. %, preferably about 0.01–20 wt. % and, most preferably, about 0.1–15 wt. % of an antioxidant and from about 75–99.9999 wt. %, preferably about 80–99.99 wt. % and, most preferably, about 85–99.9 wt. % activated carbon including any and all other impregnants and moisture. The antioxidant-activated carbon composition of the present invention can be used in any manner known in the art for removing solvents or other contaminants from laden gas. The antioxidant-activated carbon composition can be placed in a cylindrical column; a fluidized moving bed configuration; an adsorber in a canister; vessels; and roll off boxes, for example. The contaminant-laden gas is passed through the bed, wherein the contaminants adsorb onto the surface of the antioxidant-activated carbon composition and purified gas is expelled from the bed.

After the antioxidant-activated carbon composition is spent, i.e., has adsorbed the volume of contaminants, it is capable of adsorbing the antioxidant-activated carbon composition can be regenerated. Regeneration involves removal of all organic materials adsorbed on the surface of the carbon. Once the carbon is fully expended, it may be thermally reactivated followed by reapplying the antioxidant. Conversely, the antioxidant may be reapplied periodically after reactivation to maintain antioxidant properties. The antioxidant-activated carbon composition is typically regenerated by first applying downward flowing low-pressure steam or hot nitrogen. This removes the adsorbed solvent. These materials may be recovered by condensing the vapors and separating the solvent and antioxidant from water by either decantation or distillation. The steam or hot nitrogen is applied to the organic material saturated antioxidant-activated carbon composition for about 5–60 minutes, preferably about 8–50 minutes and, most preferably, about 10–40 minutes. The temperature of the steam or hot nitrogen affects the amount of time that it will need to be employed for regenerating the activated carbon. The steam or hot nitrogen temperature will be about 200–900° F., preferably about 250–750° F. and, most preferably, about 300–500° F. After steam or hot nitrogen regeneration, the hot wet GAC bed is dried, typically by use of a hot air stream. The activated carbon bed is then cooled using an ambient temperature air stream. The antioxidant could then be applied using a solution as described above. If the carbon is expended to the point where off-site or on-site thermal reactivation is required, the carbon will be reactivated and then the antioxidant is applied using an appropriate method, as described above.

The present invention is also directed to a method of thermally regenerating an oxidation resistant activated carbon that has been saturated with organic material. The method includes the steps of placing the activated carbon in a direct or indirect fired kiln or Hirschoff furnace; heating the activated carbon to about 1,000–2000° F., preferably about 1,200–1,900° F. and, most preferably, 1,600–1,800° F. in an activating gas atmosphere to remove the organic material from the surface of the activated carbon maintaining the kiln or furnace temperature for 1–12 hours and cooling the activated carbon to ambient temperature; and treating the activated carbon with an antioxidant such that the resulting activated carbon composition includes from about 0.0001–25 wt. %, preferably about 0.01–20 wt. % and, most preferably, about 0.1–15 wt. % of and antioxidant and from about 75–99.9999 wt. %, preferably about 80–99.99 wt. % and, most preferably, about 85–99.9 wt. % activated carbon including any and all other impregnants and moisture.

EXAMPLES

Exemples 1–15

These examples demonstrate the preparation of the antioxidant-activated carbon composition of the present invention. The GAC was dried to remove any traces of moisture at 150° C. for 3 hours. 40 g of the dried GAC was added to a 100 ml beaker and a solution of 4.4 g antioxidant in 6.6 g of solvent (2:3 weight ratio) was drizzled onto the surface of the GAC. The mixture was stirred by hand and then the glass jar was sealed. The glass jar was then transferred to a tumbler to continue mixing for 15 minutes. The treated GAC was either used as is or dried at 150° C. for the amount of time specified to evaporate the solvent. Table 1 shows the compositions that were produced. The weight of antioxidant was varied to generate the compositions listed in Table 1.

TABLE 1

| Sample No. | GAC (wt. %) | GAC Size | Antioxidant (wt. %) | Antioxidant | Solvent |
|---|---|---|---|---|---|
| 1 | 95 | 6 × 16 | 5 | Glauber's Salt[4] | Water |
| 2 | 90 | 6 × 16 | 10 | Irganox ® 1135[3] | Liquid product |
| 3 | 97 | 6 × 16 | 3 | Irganox ® 1010[3] | Dry blended |
| 4 | 90 | 6 × 16 | 10 | Irganox ® E201[3] | Liquid product |
| 5 | 90 | 6 × 16 | 10 | BHA | Methanol |
| 6 | 95 | 6 × 16 | 5 | TBC | Methanol |
| 7 | 90 | 6 × 16 | 10 | TBC | 70% IPA |
| 8 | 90 | 6 × 16 | 10 | TNPP | Xylene |
| 9 | 90 | 6 × 16 | 10 | BHA | Xylene |
| 10 | 92.5 | 6 × 16 | 7.5 | BHT | Xylene[1] |
| 11 | 92.5 | 6 × 16 | 7.5 | BHT | Xylene[2] |
| 12 | 92 | 6 × 16 | 8 | BHT | Xylene |
| 13 | 92.5 | 6 × 16 | 7.5 | BHT | Xylene |
| 14 | 95 | 6 × 16 | 5 | BHT | Xylene |
| 15 | 90 | 4 × 6 | 10 | BHT | Xylene |

TABLE 1-continued

| Sample No. | GAC (wt. %) | GAC Size | Antioxidant (wt. %) | Antioxidant | Solvent |
|---|---|---|---|---|---|
| 16 | 95 | 4 × 10F | 5 | BHT | Xylene |
| 17 | 90 | 4 × 6 | 10 | BHT | Xylene[1] |

[1]Dried overnight, 16–17 hours
[2]Applied to GAC using an atomizer
[3]From Ciba Specialty Chemical Company
[4]Not an antioxidant, but a heat absorptive material, i.e., negative heat of absorption
6 × 16 is a coal based GAC
4 × 10F is a coal based GAC with particle size greater than 6 × 16
4 × 6 is a coal based GAC with particle size greater than 6 × 16
4 × 6 is a coal based GAC with particle size greater than 6 × 16 or 4 × 10F

Examples 18–37

GAC samples 1–17 and two untreated control samples were tested for their susceptibility to oxidation using the following test method. A 35 g GAC sample was placed into an ignition chamber. Quartz beads were placed on top of the sample to prevent any carbon from being expelled from the ignition tube. Three thermocouples were used in the test, one placed at the bottom of the GAC sample ($T_1$); one placed at the top of the GAC sample ($T_2$); and one placed in the air chamber below the GAC sample ($T_3$). An initial flow of nitrogen (1.33 ml/sec) was started and the air chamber was heated to 260° F. At this point, an organic solvent was introduced by passing the nitrogen (bubbling) through a sample of the organic solvent. A small exotherm is observed due to the heat of adsorbtion of the organic solvent onto the GAC. When the temperature was stabilized, the nitrogen flow was stopped and air flow at 0.83 ml/sec was begun. $T_1$, was then observed to detect any exotherm due to oxidation. The temperature profiles are shown in FIGS. 1–4. Table 2 shows additional information.

TABLE 2

| Example No. | Sample No. | Description | Solvent | Approximate Rate for Temperature Rise |
|---|---|---|---|---|
| 18 | 1 | 5% Glauber's Salt/water/6 × 16 GAC | MEK | 9° F./min |
| 19 | 2 | 10% Irganox ® 1135/6 × 16 GAC | MEK | 6.5° F./min for 14 minutes followed by 1.5° F./min for 30 minutes |
| 20 | 3 | 3% Irganox ® 1010/6 × 16 GAC | MEK | 6.5° F./min for 14 minutes followed by 1.4° F./min for 30 minutes |
| 21 | 4 | 10% Irganox ® E201/6 × 16 GAC | MEK | 4.7° F./min for 22 minutes followed by 0.7° F./min for 30 minutes |
| 22 | 5 | 10% BHA/methanol/6 × 16 GAC | MEK | 0.95° F./min |
| 23 | 6 | 5% TBC/methanol/6 × 16 GAC | MEK | 1.5° F./min |
| 24 | 7 | 10% TBC/70% IPA/6 × 16 GAC | MEK | 1.67° F./min |
| 25 | 8 | 10% TNPP/xylene/6 × 16 GAC | MEK | 1.4° F./min |
| 26 | 9 | 10% BHA/xylene/6 × 16 GAC | MEK | 0.35° F./min |
| 27 | 10 | 7.5% BHT/xylene/6 × 16 GAC | MEK | 1.67° F./min |

TABLE 2-continued

| Example No. | Sample No. | Description | Solvent | Approximate Rate for Temperature Rise |
|---|---|---|---|---|
| 28 | 11 | 7.5% BHT/xylene/ 6 × 16 GAC | MEK | 0.86° F./min |
| 29 | 12 | 8% BHT/xylene/ 6 × 16 GAC | MEK | 0.70° F./min |
| 30 | 13 | 7.5% BHT/xylene/ 6 × 16 GAC | Gasoline | 0.17° F./min |
| 31 | 14 | 5% BHT/xylene/ 6 × 16 GAC | MEK | 0.73° F./min |
| 32 | 15 | 10% BHT/xylene/ 4 × 6 GAC | MEK | 0.125° F./min |
| 33 | 16 | 5% BHT/xylene/ 4 × 10F GAC | Gasoline | 0.13° F./min |
| 34 | 17 | 10% BHT/xylene/ 4 × 6 GAC | Gasoline | 0.17° F./min |
| 35 | 18 | 100% 6 × 16 GAC | MEK | 6.5° F./min |
| 36 | 19 | 100% 4 × 6 GAC | MEK | 4.1° F./min for 28 minutes followed by 0.8° F./min for 46 minutes |
| 37 | 20 | 10% BHT/xylene/ 4 × 10S GAC | MEK | 1.5° F./min |

˜Not shown in FIGS. 1–4
6 × 16 is a coal-based GAC
4 × 10F is a coal-based GAC with particle size greater than 6 × 16
4 × 10S is a coconut shell-based GAC with particle size greater than 6 × 16
4 × 6 is a coal-based GAC with particle size greater than 6 × 16

The results demonstrate the ability of GAC-antioxidant compositions of the present invention to decrease and minimize exotherms resulting from oxidation of a GAC bed that has adsorbed a flammable solvent and has been exposed to oxygen in air.

Exemples 38–52

The following examples demonstrate the minimal loss of working capacity of the GAC-antioxidant compositions of the present invention. The compositions were prepared as discussed in Examples 1–17. The test method is described in ASTM D 5228-92 and ASTM D 5742-95 herein incorporated by reference. The test method determines the amount of butane adsorbed by the GAC, which is expressed as a value correlated to grams of carbontetrachloride adsorbed/ 100 g GAC (gCCl$_4$/100 g GAC). The samples were prepared as described above with results shown in Table 3.

TABLE 3

| Example No. | Sample No. | Sample Description | gCCl$_4$/ 100 g GAC |
|---|---|---|---|
| 38 | 1 | 5% Glauber's Salt/water/ 6 × 16 GAC | 70.17 |
| 39 | 5 | 10% BHA/methanol/6 × 16 GAC | 41.72 |
| 40 | 9 | 10% BHA/xylene/6 × 16 GAC | 34.3 |
| 41 | 10 | 7.5% BHT/xylene$^5$/6 × 16 GAC | 64.63 |
| 42 | 14 | 5% BHT/xylene/6 × 16 GAC | 61.87 |
| 43 | 16 | 5% BHT/xylene$^6$/4 × 10F GAC | 47.43 |
| 44 | 18 | 100% GAC/6 × 16 GAC | 94.16 |
| 45 | 19 | 10% TBC/methanol/6 × 16 GAC | 57.0 |
| 46 | 20 | 5% TBC/methanol$^3$/6 × 16 GAC | 71.74 |
| 47 | 20 | 10% BHT/xylene$^1$/4 × 10F GAC | 30.74 |
| 48 | 21 | 10% BHT/xylene$^2$/4 × 10F GAC | 41.22 |
| 49 | 22 | 10% BHT/xylene$^3$/4 × 10F GAC | 33.08 |

TABLE 3-continued

| Example No. | Sample No. | Sample Description | gCCl$_4$/ 100 g GAC |
|---|---|---|---|
| 50 | 23 | 10% BHT/xylene$^4$/6 × 16 GAC | 55.89 |
| 51 | 24 | 7.5% BHT/xylene$^5$/6 × 16 GAC | 63.08 |
| 52 | 25 | 100% GAC/4 × 10F GAC | 64.13 |

6 × 16 is a coal-based GAC
4 × 10 is a coal-based GAC with particle size greater than 6 × 16
$^1$Dried at 500° C. for 30 minutes with steam
$^2$Dried at 600° C. for 30 minutes with steam
$^3$Dried 9 hours at 150° C.
$^4$Dried 13 hours at 150° C.
$^5$Dried 16 hours at 150° C.
$^6$Dried 17 hours at 150° C.

The results demonstrate that the GAC-antioxidant compositions of the present invention maintain an adsorbtion capability.

Exemples 53–58

This test evaluates the susceptibility of a GAC sample to uncontrolled oxidation. A 150 g sample of GAC is placed in a one-liter Erlenmeyer flask to which 15 cc of water is added while swirling the flask. Using a burette, 22.5 g of methylketone (MEK) is added dropwise to the wet carbon in the Erlenmeyer flask while continually swirling the flask. The GAC is then removed from the Erlenmeyer flask and placed in a one-pint Dewar flask. A thermocouple, which is connected to a strip-chart recorder, is placed in the center of the GAC sample. The Dewar flask is then placed in an oven with temperature maintained at 80±2° C. The temperature is recorded for up to 36 hours to determine a peak temperature and a time to reach the peak temperature. Lower peak temperatures and longer time to peak temperature indicate that a sample is more resistant to uncontrolled oxidation. The GAC-antioxidant compositions were prepared as outlined in the previous examples. The results of this test are outlined in Table 4.

TABLE 4

| Example No. | Sample Description | Peak Temp. (° F.) | Time to Peak (hours) |
|---|---|---|---|
| 53 | Base 6 × 16 granular activated carbon (GAC) | 252 | 24 |
| 54 | 6 × 16 GAC with 5% BHT, xylene solvent, dried for 3 hours at 150° C. | 230 | 34.5 |
| 55 | Base 4 × 10F granular activated carbon (GAC) | 256 | 21.5 |
| 56 | 4 × 10F GAC with 5% BHT, xylene solvent, dried for 3 hours at 150° C. | 255 | 25 |
| 57 | 4 × 10F GAC with 7.5% BHT, xylene solvent, dried for 13 hours at 150° C. | 258 | 34.0 |
| 58 | 4 × 10F GAC with 10% BHT, xylene solvent, dried for 13 hours at 150° C. | 260 | 35.25 |

The results demonstrate the resistance to oxidation of the GAC-antioxidant compositions of the present invention.

Exemple 59

Figure 1:
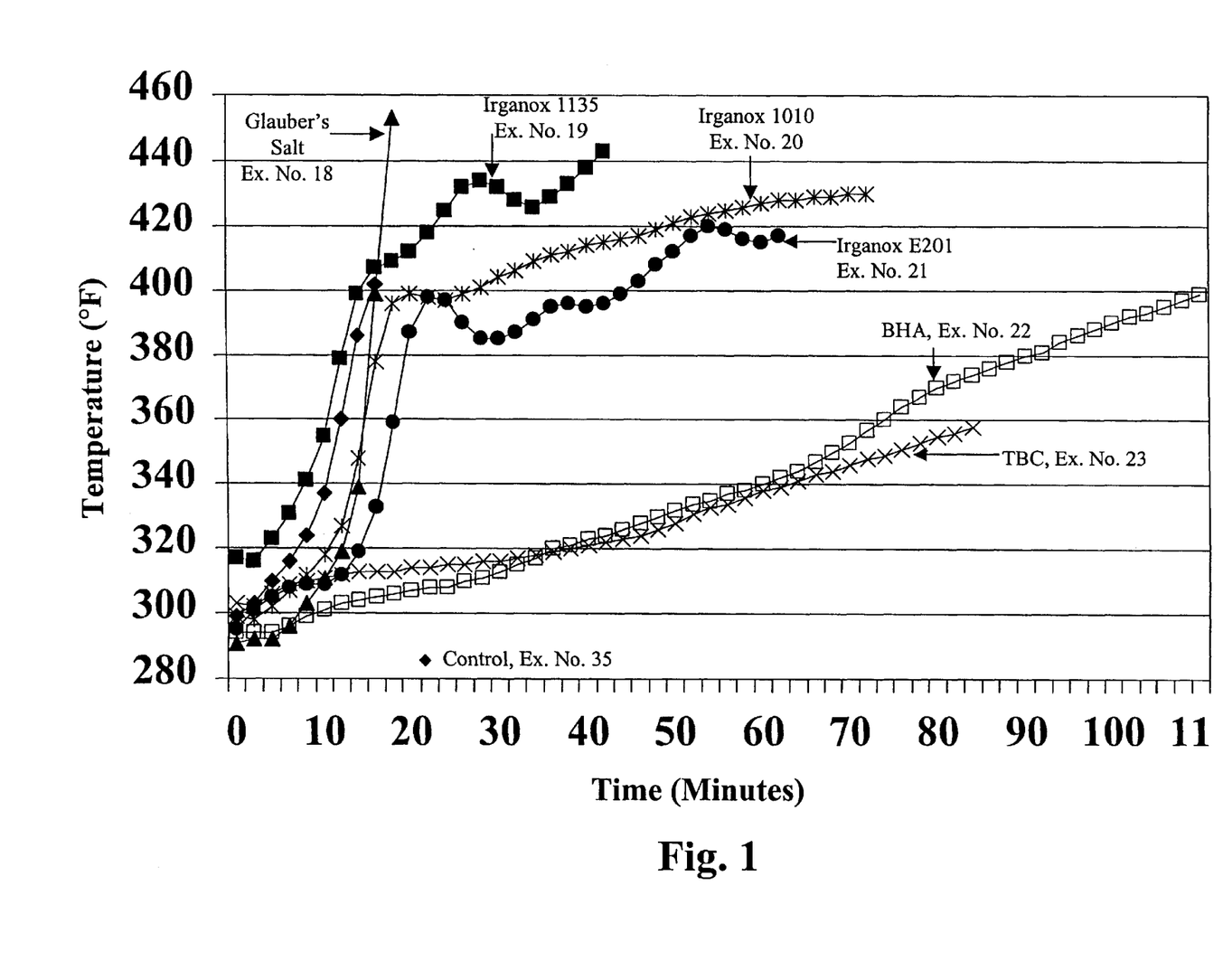
FIG. 1 is a graph showing a granular activated carbon (GAC) bed temperature over time using different GAC treatments.
Figure 2:
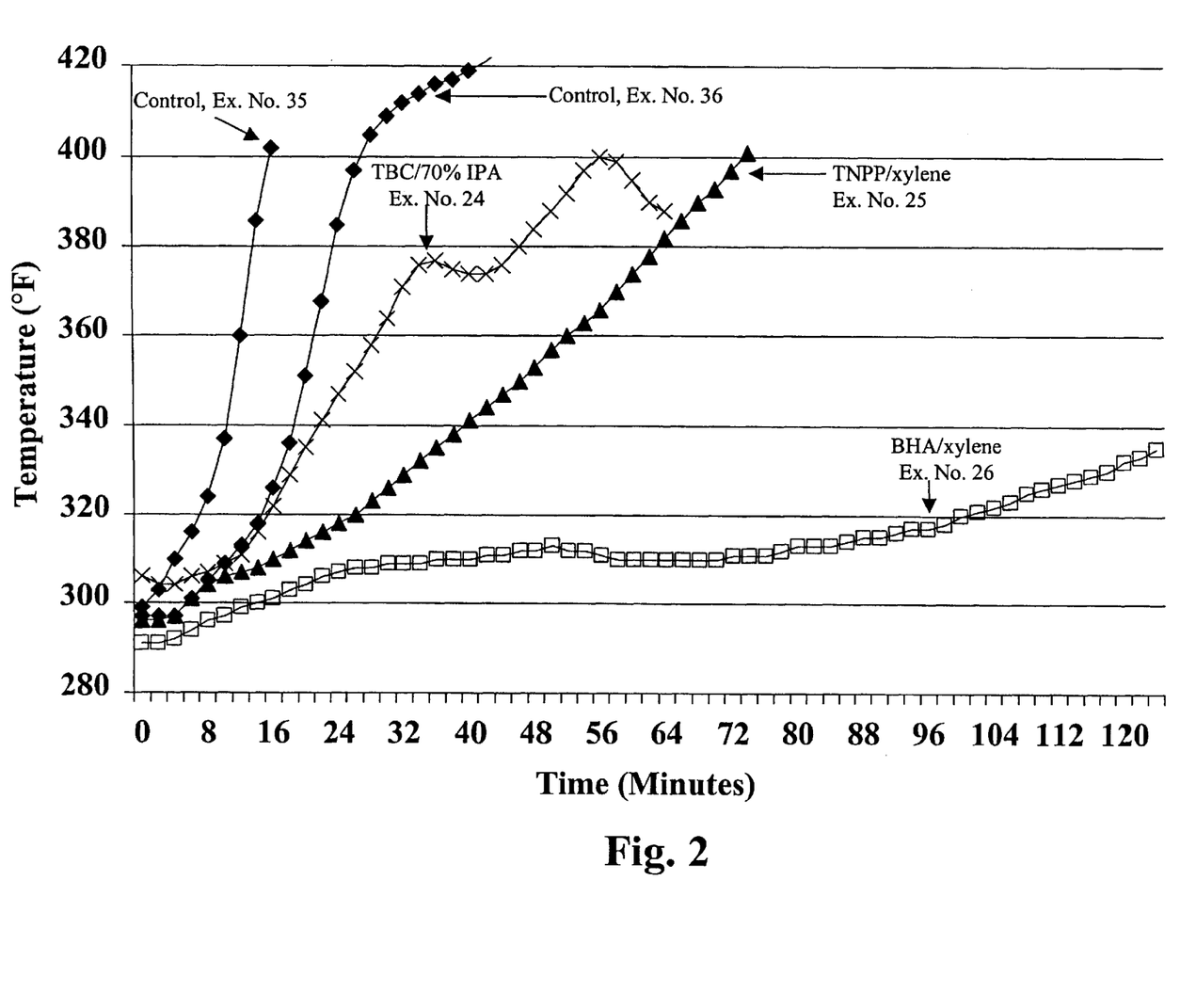
FIG. 2 is a graph showing a GAC bed temperature over time using different GAC treatments.
Figure 3:
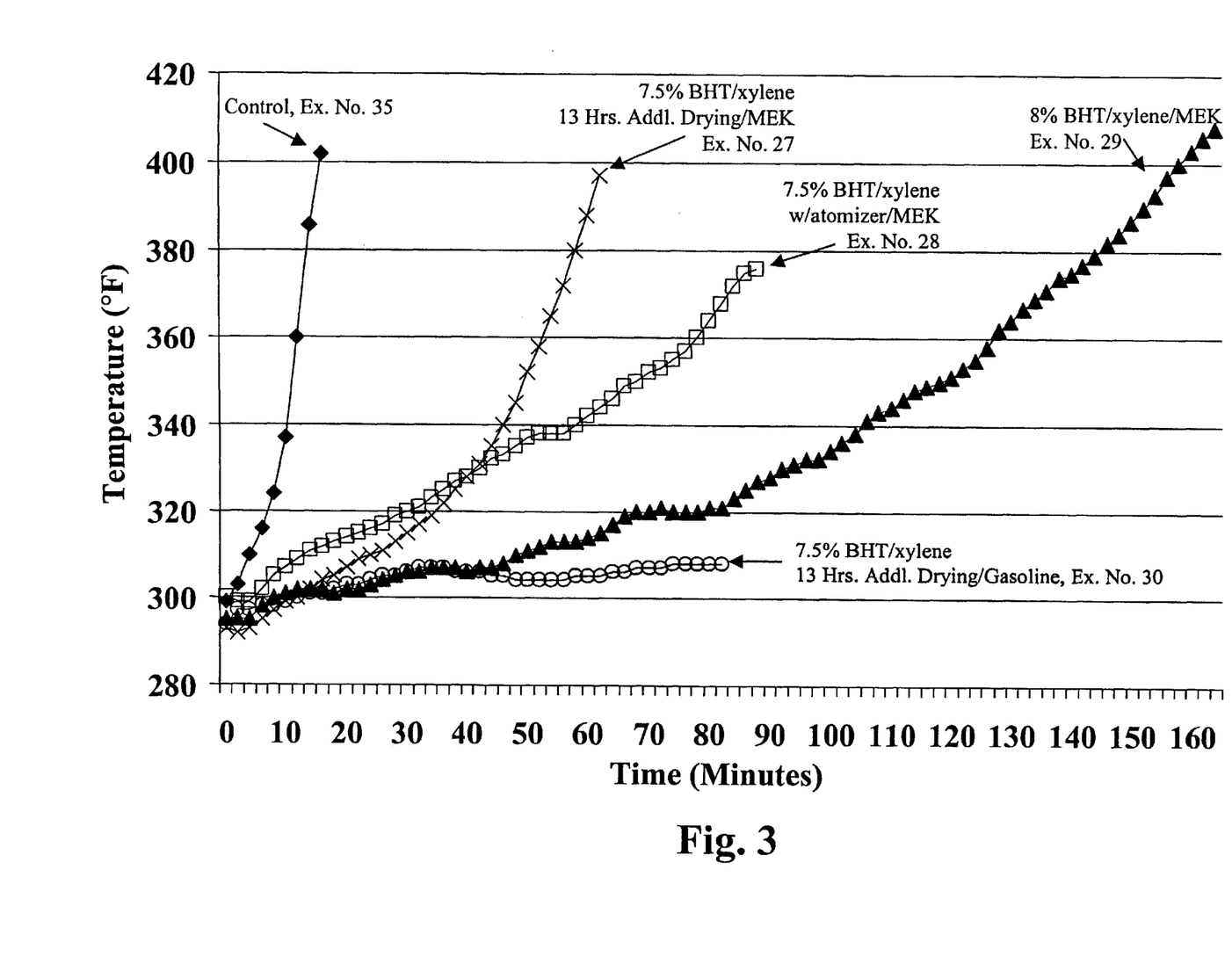
FIG. 3 is a graph showing a GAC bed temperature over time using different GAC treatments.
Figure 4:
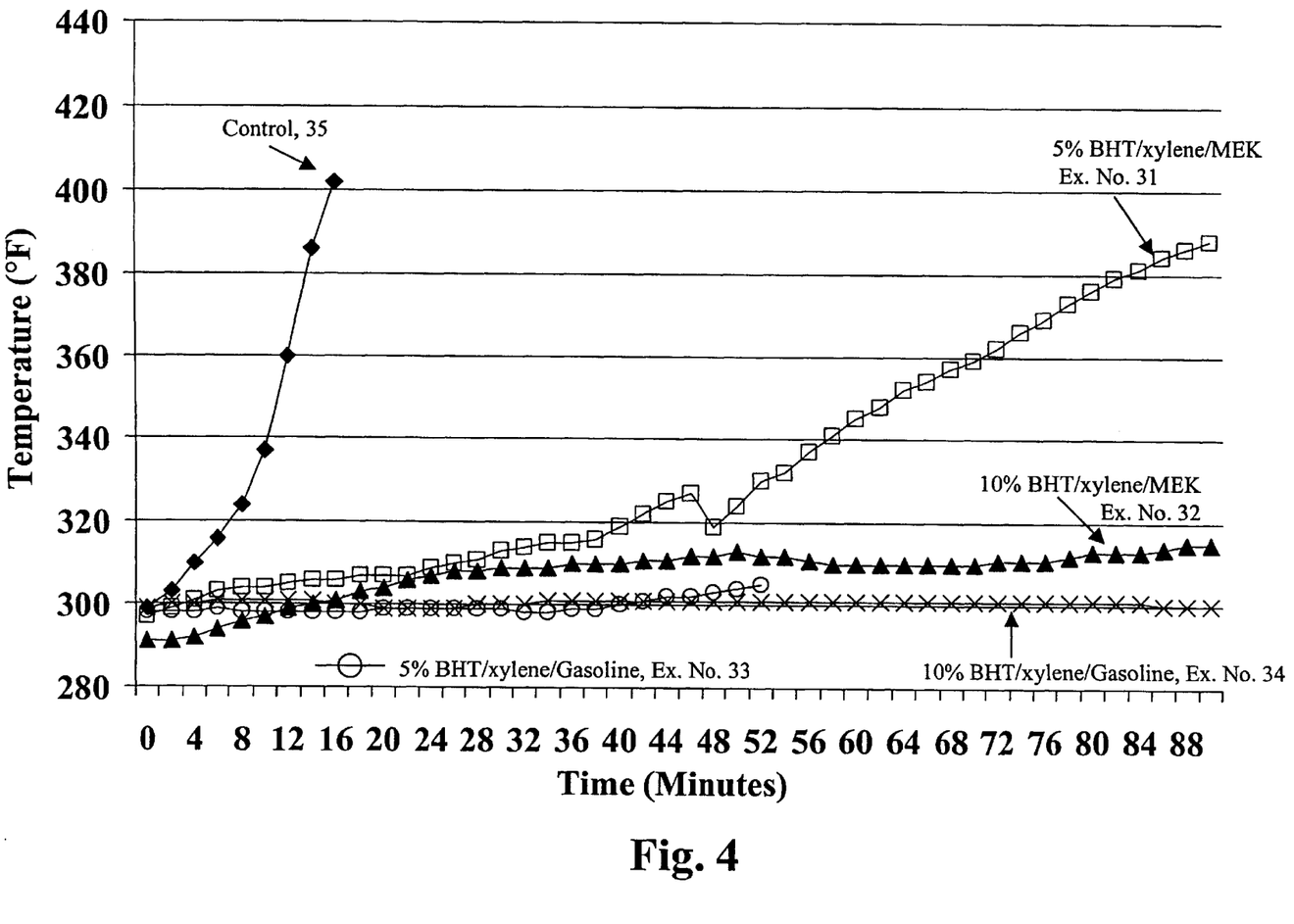
FIG. 4 is a graph showing a GAC bed temperature over time with varying concentrations of BHT treatment on GAC.
Figure 5:
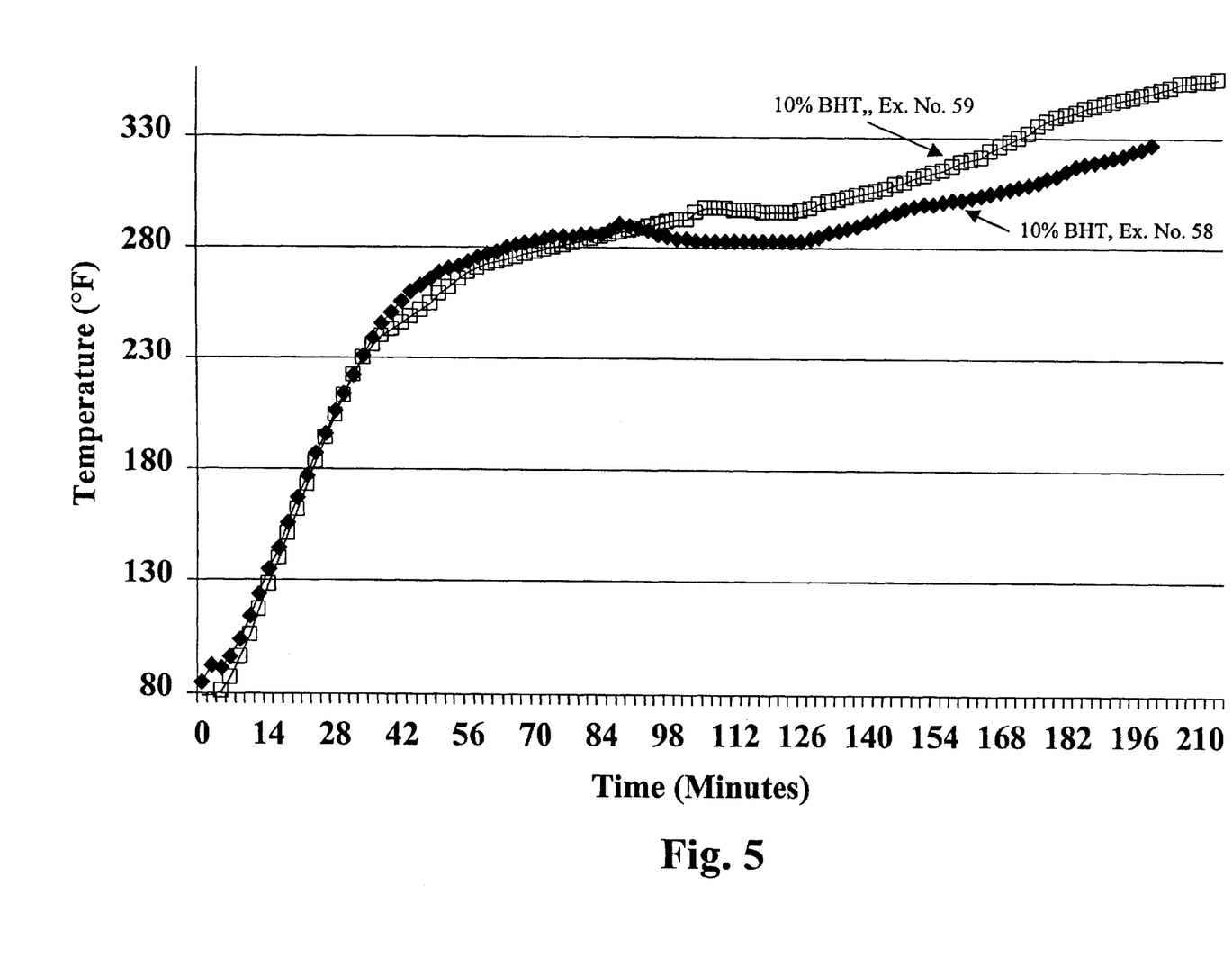
FIG. 5 is a graph showing a GAC bed temperature over time curve with different GAC types.

This example demonstrates the regeneration of the GAC-antioxidant composition. The 4×10F coal-based GAC used in this experiment was dried for 3 hours at 150° C. prior to use and had an apparent density of 0.452 g/cc and an activity of 64.13 g CCl4/100 g GAC. A GAC-antioxidant composition was made as described above which included 90% GAC and 10% BHT. Xylene, at a weight ratio of 3:2 xylene:BHT, was utilized as solvent and was removed by drying at 150° C. for 24 hours. The GAC-antioxidant composition had an apparent density of 0.551 g/cc and an activity of 36.93 g CCl4/100 g GAC. This sample was then saturated with MEK as described in Examples 18–36. The temperature versus time profile is shown in FIG. 5. The apparent density of the MEK saturated GAC-antioxidant composition was 0.599 g/cc. The MEK saturated GAC-antioxidant composition was then exposed to steam at a temperature of 1,750° F. for 15 minutes to remove the MEK and antioxidant from the surface of the GAC. The resulting activated carbon had an apparent density of 0.518 g/cc and an activity of 59.67 g CCl4/100 g GAC, thus, returning the GAC to near its original condition. A BHT-xylene solution was then reapplied with subsequent removal of xylene by drying at 150° C. for 24 hours, effectively regenerating the 90% GAC—10% BHT GAC-antioxidant composition.

Example 60

This example demonstrates the regeneration of the GAC-antioxidant composition. The 6×16 coal-based GAC used in this experiment was dried for 3 hours at 150° C. prior to use and had an apparent density of 0.341 g/cc and an activity of 94.16 g CCl4/100 g GAC. A GAC-antioxidant composition was made as described above which included 90% GAC and 10% BHT. Xylene, at a weight ratio of 3:2 xylene:BHT, was utilized as solvent and was removed by drying at 150° C. for 24 hours. The GAC-antioxidant composition had an apparent density of 0.399 g/cc and an activity of 63.73 g CCl4/100 g GAC. This sample was then saturated with MEK as described in Examples 18–36. The temperature versus time profile is shown in FIG. 5. The apparent density of the MEK saturated GAC-antioxidant composition was 0.409 g/cc. The MEK saturated GAC-antioxidant composition was then exposed to steam at a temperature of 1,750° F. for 15 minutes to remove the MEK and antioxidant from the surface of the GAC. The resulting activated carbon had an apparent density of 0.345 g/cc and an activity of 95.06 g CCl4/100 g GAC. Thus, returning the GAC to near its original condition. A BHT-xylene solution was then reapplied with subsequent removal of xylene by drying at 150° C. for 24 hours effectively regenerating the 90% GAC—10% BHT GAC-antioxidant composition.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

I claim:

1. A method of removing solvents from a solvent-laden gas comprising the steps of providing an activated carbon bed which comprises an activated carbon composition comprising from about 0.0001–25 wt. % of an antioxidant and from about 75–99.9999 wt. % activated carbon including any and all other impregnants and moisture; and passing a solvent-laden gas through said activated carbon bed.

2. The method of removing solvents from a solvent-laden gas as claimed in claim 1, wherein the antioxidant is selected from the group consisting of butylated hydroxyanisole, butylated hydroxytoluene and tert-butylcatechol.

3. The method of removing solvents from a solvent-laden gas as claimed in claim 1, wherein the activated carbon is a GAC.

4. The method of removing solvents from a solvent-laden gas as claimed in claim 1, wherein the activated carbon is derived from bituminous coal, anthracite, lignite, wood, peat or coconut shells.

5. The method of removing solvents from a solvent-laden gas as claimed in claim 1, wherein the activated carbon composition is prepared by treating the activated carbon with a solution of the antioxidant in a treatment solvent and subsequently removing the treatment solvent through evaporation.

6. The method of removing solvents from a solvent-laden gas as claimed in claim 5, wherein the treatment solvent is selected from the group consisting of xylene, mineral spirits, methanol, ethanol, isopropyl alcohol, n-propanol, water, cyclohexane, ethylacetate, n-hexane and toluene.

7. The method of removing solvents from a solvent-laden gas as claimed in claim 5, wherein the activated carbon is treated with the solution of antioxidant by spraying the solution onto the surface of the activated carbon, bubbling the solution through a bed of activated carbon, immersing the activated carbon in the solution, or by vaporization adsorption of the antioxidant onto the activated carbon.

8. The method of removing solvents from a solvent-laden gas as claimed in claim 5, wherein the treatment solvent is evaporated by exposing the activated carbon composition to a temperature of about 35–300° C. for about 1–40 hours.

9. The method of removing solvents from a solvent-laden gas as claimed in claim 1, wherein the particle size distribution of the activated carbon composition is no wider than 2×40.

10. A method of regenerating an oxidation resistant activated carbon composition that has been saturated with organic material comprising the steps of:
    heating the activated carbon composition to a temperature in excess of about 200° F.; and
    treating the activated carbon with an antioxidant such that the resulting regenerated activated carbon composition comprises about 0.0001–25 wt. % of an antioxidant and from about 75–99.9999 wt. % activated carbon including any and all other impregnants and moisture.

11. The method of regenerating an oxidation resistant activated carbon composition as claimed in claim 10, additionally comprising the steps of:
    drying the activated carbon composition using a hot air stream; and
    cooling the activated carbon composition using an ambient temperature air stream prior to treating the activated carbon composition.

12. The method of regenerating an oxidation resistant activated carbon composition as claimed in claim 10, wherein the activated carbon composition is heated by applying downward flowing low-pressure steam or hot nitrogen.

13. The method of regenerating an oxidation resistant activated carbon composition as claimed in claim 12, wherein the steam or hot nitrogen is applied to the activated carbon composition for about 5–60 minutes and the temperature of the steam or hot nitrogen is about 200–900° F.

14. The method of regenerating an oxidation resistant activated carbon composition as claimed in claim 10, wherein the antioxidant is selected from the group consisting of butylated hydroxyanisole, butylated hydroxytoluene and tert-butylcatechol.

15. The method of regenerating an oxidation resistant activated carbon composition as claimed in claim 10, wherein the regenerated activated carbon composition is prepared by treating the activated carbon with a solution of the antioxidant in a solvent and, subsequently, removing the solvent through evaporation.

16. The method of regenerating an oxidation resistant activated carbon composition as claimed in claim 15, wherein the solvent is selected from the group consisting of xylene, mineral spirits, methanol, ethanol, isopropyl alcohol, n-propanol, water, cyclohexane, ethylacetate, n-hexane and toluene.

17. The method of regenerating an oxidation resistant activated carbon composition as claimed in claim 15, wherein the activated carbon is treated with the solution of antioxidant by spraying the solution onto the surface of the activated carbon, bubbling the solution through a bed of activated carbon, or immersing the activated carbon in the solution, or by vaporization adsorption of the antioxidant onto the activated carbon.

18. The method of regenerating oxidation resistant activated carbon composition as claimed in claim 15, wherein the solvent is evaporated by exposing the regenerated activated carbon composition to a temperature of about 35–300° C. for about 1–40 hours.

19. The method of regenerating an oxidation resistant activated carbon composition as claimed in claim 10 wherein the particle size distribution of the activated carbon composition is no wider than 2×40.

20. A method of regenerating an oxidation resistant activated carbon composition that has been saturated with organic material comprising the steps of:
   placing the activated carbon in a direct or indirect fired kiln or Hirschoff furnace;
   heating the activated carbon to about 1,000–2,000° F. in an activating gas atmosphere;
   cooling the activated carbon to ambient temperature; and
   treating the activated carbon with an antioxidant such that the resulting regenerated activated carbon composition comprises about 0.0001–25 wt. % of an antioxidant and from about 75–99.9999 wt. % activated carbon including any and all other impregnants and moisture.

21. The method of regenerating an oxidation resistant activated carbon composition as claimed in claim 20, wherein the antioxidant is selected from the group consisting of butylated hydroxyanisole, butylated hydroxytoluene and tert-butylcatechol.

22. The method of regenerating an oxidation resistant activated carbon composition as claimed in claim 20, wherein the regenerated activated carbon composition is prepared by treating the activated carbon with a solution of the antioxidant in a solvent and, subsequently, removing the solvent through evaporation.

23. The method of regenerating an oxidation resistant activated carbon composition as claimed in claim 22, wherein the solvent is selected from the group consisting of xylene, mineral spirits, methanol, ethanol, isopropyl alcohol, n-propanol, water, cyclohexane, ethylacetate, n-hexane and toluene.

24. The method of regenerating an oxidation resistant activated carbon composition as claimed in claim 22, wherein the activated carbon is treated with the solution of antioxidant by spraying the solution onto the surface of the activated carbon, bubbling the solution through a bed of activated carbon, or immersing the activated carbon in the solution, or by vaporization adsorption of the antioxidant onto the activated carbon.

25. The method of regenerating an oxidation resistant activated carbon composition as claimed in claim 22, wherein the solvent is evaporated by exposing the regenerated activated carbon composition to a temperature of about 35–300° C. for about 1–40 hours.

26. The method of regenerating an oxidation resistant activated carbon composition as claimed in claim 20, wherein the particle size distribution of the activated carbon composition is no wider than 2×40.

27. An activated carbon composition comprising from about 0.0001–25 wt. % of an antioxidant and from about 75–99.9999 wt. % activated carbon including any and all other impregnants and moisture.

28. The activated carbon composition as claimed in claim 27, wherein the antioxidant is selected from the group consisting of butylated hydroxyanisole; butylated hydroxytoluene; tert-butylcatechol; 2,6-di-t-butyl paracresol; 2,2'-methylene-bis-(6-t-butyl-phenol); 2,2'-thiobis-(4-methyl-6-t-butyl-phenol); 2,2'-methylene-bis-(6t-butyl-4-ethyl-phenol); 4,4'-butylene-bis-(6-t-butyl-m-cresol); 2-(4-hydroxy-3,5-di-t-butyl anilino)-4,6-bis-(octylthio)-1,3,5-triazine; hexahydro-1,3,5-tris-(3,5-di-t-butyl-4-hydroxy phenyl)-propionyl-s-triazine; hexahydro-1,3,5-tris-(3,5-di-t-butyl-4-hydroxy benzyl) isocyanurate; tetrakismethylene-3-(3',5'-di-t-butyl-4'-hydroxyphenyl)propionate methane; distearyl thiodipropionate; dilauryl thiodipropionate; tri (nonylphenyl) phosphite; tin thioglycolate; alkylated monophenols; alkylated hydroquinone; hydroxylated thiodiphenylethers; alkylidene-bisphenols; benzyl compounds; acylaminophenols; amides of β-3,5-di-tert.-butyl-4-hydroxyphenyl-proprionic acid; phenothiazine and its derivatives; alkyl; aryl and alkaryl phosphites; esters of thioproprionic acid; tris(3,5-di-tert-butyl-4-hydroxybenzyl) isocyanurate, poly(3,5-di-tert-butyl-4-hydroxy hydrocinamic acid ester/1,3,5-tris(2-hydroxyethyl)-5-triazine-2,4,6 (1H,3H,5H)-trione, pentaerythritol tetrakis(3-(3,5-di-tert-butyl-4-hydroxyphenyl)proprionate), thiodiethylene bis[3-(3,5-di-tert-butyl-4-hydroxyphenyl)propionate], octadecyl-3-(3,5-di-tert-butyl-4-hydroxyphenyl)-propionate, 6,6'-di-tert-butyl-2,2'-thiodi-p-cresol, n,n'-hexane-1,6-diylbis[3-(3,5-di-tert-butyl-4-hydroxyphenylproprionamide], 3,5-bis (1,1-dimethyl-ethyl)-4-hydroxy-C7–C9 branched alkyl esters of benzenepropanoic acid, 2,4-dimethyl-6-(1-methylpentadecyl)-phenol, 3, 3',3",5,5',5"-hexa-tert-butyl-α,α', α"-(mesitylene-2,4,6-triyl) tri-p-cresol, calcium diethyl bis [[[3,5-bis(1,1-dimethylethyl)-4-hydroxyphenyl] methyl]phosphonate], 4,6-bis (octylthiomethyl)-o-cresol, ethylenebis (oxyethylene) bis-(3-(5-tert-butyl-4-hydroxy-m-tolyl)-propionate), hexamethylene bis (3-(3,5-di-tert-butyl-4-hydroxyphenyl) propionate), 2-(1,1-dimethylethyl)-6-[[3-(1,1-dimethylethyl)-2-hydroxy-5-methylphenyl]methyl-4-methylphenyl acrylate, 1,3,5-tris(3,5-di-tert-butyl-4-hydroxybenzyl)-1,3,5-triazine-2,4,6(1H,3H,5H)-trione, (2,4,6-trioxo-1,3,5-triazine-1,3,5(2H,4H,6H)-triyl) triethylene tris(3-(3,5-di-tert-butyl-4-hydroxphenyl)propionate), reaction products of n-phenyl-benzenamine and 2,4,4-trimethylpentene, 2,6-di-tert-butyl-4-(4,6-bis(octylthio)-1,3, 5-triazin-2-ylamino)phenol and mixtures thereof.

29. The activated carbon composition as claimed in claim 27, wherein the antioxidant is selected from the group consisting of butylated hydroxyanisole, butylated hydroxytoluene, and tert-butylcatechol.

30. The activated carbon composition as claimed in claim 27, wherein the activated carbon is a granular activated carbon (GAC).

31. The activated carbon composition as claimed in claim 27, wherein the activated carbon is derived from bituminous coal, anthracite, lignite, wood, peat or coconut shells.

32. The activated carbon composition as claimed in claims 27, wherein the activated carbon composition is prepared by treating the activated carbon with a solution of the antioxidant in a solvent and subsequently removing the solvent through evaporation.

33. The activated carbon composition as claimed in claim 32, wherein the solvent is selected from the group consisting of xylene, mineral spirits, methanol, ethanol, isopropyl alcohol, n-propanol, water, cyclohexane, ethylacetate, n-hexane and toluene.

34. The activated carbon composition as claimed in claim 32, wherein the activated carbon is treated with the solution of antioxidant by spraying the solution onto the surface of the activated carbon, bubbling the solution through a bed of activated carbon, or immersing the activated carbon in the solution.

35. The activated carbon composition as claimed in claim 32, wherein the solvent is evaporated by exposing the activated carbon composition to a temperature of about 35–300° C. for about 1–40 hours.

36. The activated carbon composition as claimed in claim 27, wherein the activated carbon composition is prepared by vaporization adsorption of the antioxidant onto the activated carbon.

37. The activated carbon composition as claimed in claim 27, wherein the particle size distribution is no wider than 2×40.

38. A method for preventing fires in an activated carbon bed comprising: providing an activated carbon composition having from about 0.0001–25 wt. % of an antioxidant and from about 75–99.9999 wt. % of an activated carbon including any and all other impregnants and moisture, and forming an activated carbon bed made from said activated carbon composition.

39. The method for preventing fires in an activated carbon bed as claimed in claim 38, wherein the antioxidant is selected from the group consisting of butylated hydroxyanisole, butylated hydroxytoluene and tert-butylcatechol.

40. The method for preventing fires in an activated carbon bed as claimed in claim 38, wherein the activated carbon is a GAC.

41. The method for preventing fires in an activated carbon bed as claimed in claim 38, wherein the activated carbon is derived from bituminous coal, anthracite, lignite, wood, peat or coconut shells.

42. The method for preventing fires in an activated carbon bed as claimed in claim 38, wherein the activated carbon bed is a cylindrical column, a fluidized moving bed, an adsorber in a canister, a vessel, or a roll-off box.

43. The method for preventing fires in an activated carbon bed as claimed in claim 38, wherein the activated carbon composition is prepared by treating the activated carbon with a solution of the antioxidant in a solvent and, subsequently, removing the solvent through evaporation.

44. The method for preventing fires in an activated carbon bed as claimed in claim 43, wherein the solvent is selected from the group consisting of xylene, mineral spirits, methanol, ethanol, isopropyl alcohol, n-propanol, water, cyclohexane, ethylacetate, n-hexane and toluene.

45. The method for preventing fires in an activated carbon bed as claimed in claim 43, wherein the activated carbon is treated with the solution of antioxidant by spraying the solution onto the surface of the activated carbon, bubbling the solution through the bed of activated carbon, immersing the activated carbon in the solution, or by vaporization adsorption of the antioxidant onto the activated carbon.

46. The method for preventing fires in an activated carbon bed as claimed in claim 43, wherein the solvent is evaporated by exposing the activated carbon composition to a temperature of about 35–300° C. for about 1–40 hours.

47. The method for preventing fires in an activated carbon bed as claimed in claim 38, wherein the particle size distribution of the activated carbon composition is no wider than 2×40.

* * * * *

UNITED STATES PATENT AND TRADEMARK OFFICE
CERTIFICATE OF CORRECTION

PATENT NO.   : 6,425,941 B1
DATED        : July 30, 2002
INVENTOR(S)  : Robert G. Roodman It is certified that error appears in the above-identified patent and that said Letters Patent is hereby corrected as shown below:

Column 6,
Line 1, "2:1-1:1 0" should read -- 2:1-1:10 --.

Column 7,
Line 31, "Exemples 1-15" should read -- Examples 1-15 --.

Column 9,
Table 2 Last Column Last Row, "F./min" should read -- F./minA --.
Table 2 Footer Line 1, "Not" should read -- ANot --.
Table 2 Footer Last Line, "6 x 16" should read -- 6 x 16 or 4 x 10F --.
Line 38, "Exemples 38-52" should read -- Examples 38-52 --.

Column 10,
Line 20, "Exemples 53-58" should read -- Examples 53-58 --.
Lines 24-25, "methylkeytone" should read -- methylethylkeytone --.
Line 60, "Exemple 59" should read -- Example 59 --.

Signed and Sealed this

Fourteenth Day of January, 2003

JAMES E. ROGAN
*Director of the United States Patent and Trademark Office*